INVENTORS
THEODORE S. BRISKIN
FRANK C. LUSTIG
ROBERT L. MOORE

BY
Ooms, McDougall, Williams & Hersh
*Attorneys*

INVENTORS
THEODORE S. BRISKIN
FRANK C. LUSTIG
ROBERT L. MOORE
BY
*Ooms, McDougall, Williams & Hersh*
Attorneys Aug. 8, 1961  T. S. BRISKIN ET AL  2,995,061
MECHANISM FOR ADJUSTING ZOOM LENS ASSEMBLY
Filed May 29, 1959  5 Sheets-Sheet 3

INVENTORS
THEODORE S. BRISKIN
FRANK C. LUSTIG
ROBERT L. MOORE
BY Dome, McDougall, Williams & Hersh
Attorneys Aug. 8, 1961 T. S. BRISKIN ET AL 2,995,061
MECHANISM FOR ADJUSTING ZOOM LENS ASSEMBLY
Filed May 29, 1959 5 Sheets-Sheet 4

INVENTORS
THEODORE S. BRISKIN
FRANK C. LUSTIG
ROBERT L. MOORE

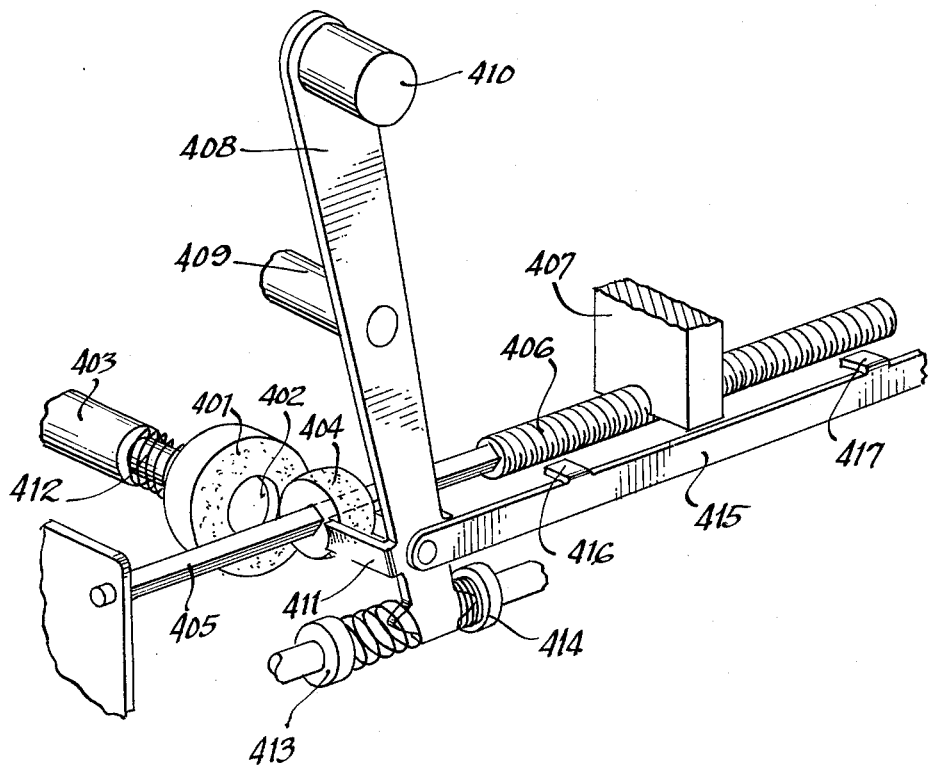

United States Patent Office 2,995,061
Patented Aug. 8, 1961

2,995,061
MECHANISM FOR ADJUSTING ZOOM LENS
ASSEMBLY
Theodore S. Briskin, Chicago, Frank C. Lustig, Highland Park, and Robert L. Moore, La Grange Highlands, Ill., assignors to Revere Camera Company, Chicago, Ill., a corporation of Delaware
Filed May 29, 1959, Ser. No. 816,924
8 Claims. (Cl. 88—16)

This invention relates to a mechanism for automatically adjusting a movie camera lens assembly of the zoom type forward or backward to any position desired by the camera operator, from wide angle through normal to telephoto.

The desirability of obtaining both close-up and distance shots of the subject being photographed at intermittent intervals during one continuous picture-taking operation has long been recognized by both professional and amateur photographers. In the early days of professional motion picture photography, this so-called zoom effect was achieved by mounting the camera upon a movable carriage, the position of which could be shifted with relation to the subject being photoraphed in order to obtain normal, close-up or distance shots, as desired.

For the amateur movie photographer, cameras having a multi-lens turret were provided, but the fact that the camera operator was required to discontinue shooting during the intervals when the turret was being moved from one lens position to another made it impossible to achieve a true zoom effect.

Ultimately a unitary lens assembly containing at least one lens which could be moved forward and backward relative to the camera frame in order to produce a zoom effect was developed. Originally a lens assembly of this type had to be manually focused by the camera operator at the same time it was being manually adjusted forward or backward, in order to insure that satisfactory pictures would be obtained at all points throughout its range of movement. Such a lens not only required a skilled operator but was incorporated in a complicated and cumbersome assembly which was relatively expensive and definitely out of the amateur class.

In recent years zoom lens assemblies of the fixed focus type have been developed for use with professional motion picture and television cameras and, still more recently, for the 8 mm. movie cameras customarily used by amateur photographers.

In all existing zoom lens assemblies the zoom effect has been achieved through manual adjustment of the lens assembly by the camera operator, ordinarily through the utilization of a hand actuated lever for moving the lens assembly forward and backward relative to the camera frame. To obtain a professionally smooth effect, the tempo of movement of the zoom lens should, of course, be constant. For the amateur photographer, using an 8 mm. camera which is not mounted on a tripod but must be held in the hands, manual adjustment of a zoom lens assembly at a constantly even tempo poses an exceedingly difficult problem, since the photographer must simultaneously sight the subject in the view finder, depress the operating button, "pan" the camera if the subject is moving, and adjust the position of the lens. It is, therefore, not surprising that, through inadvertent movement of the camera frame during manual adjustment of a zoom type lens, blurred or fuzzy pictures are often obtained.

The primary object of this invention is to provide a mechanism for automatically adjusting a zoom lens assembly, which does not require the camera operator to move either hand from the camera frame to the lens assembly or a hand-actuated lens-adjusting lever positioned thereon, and does not otherwise interfere with the sighting of the camera during the lens adjustment operation.

A second object of the invention is to provide such a mechanism in combination with a view finder which is coupled to the zoom lens assembly, so that the camera operator will always observe in the view finder exactly the same scene which is being photographed at any given point throughout the entire range of adjustment of the zoom lens assembly.

A third object of the invention is to provide such a mechanism which can be operated either automatically or manually, according to the preference of the photographer.

Further objects and advantages of the invention will be apparent from a detailed description of the mechanism shown in the accompanying drawings, in which:

FIGURE 9 is a diagrammatic representation of still another mechanism for accomplishing the automatic adjustment of a zoom lens assembly and coupled view finder.

Figure 1:
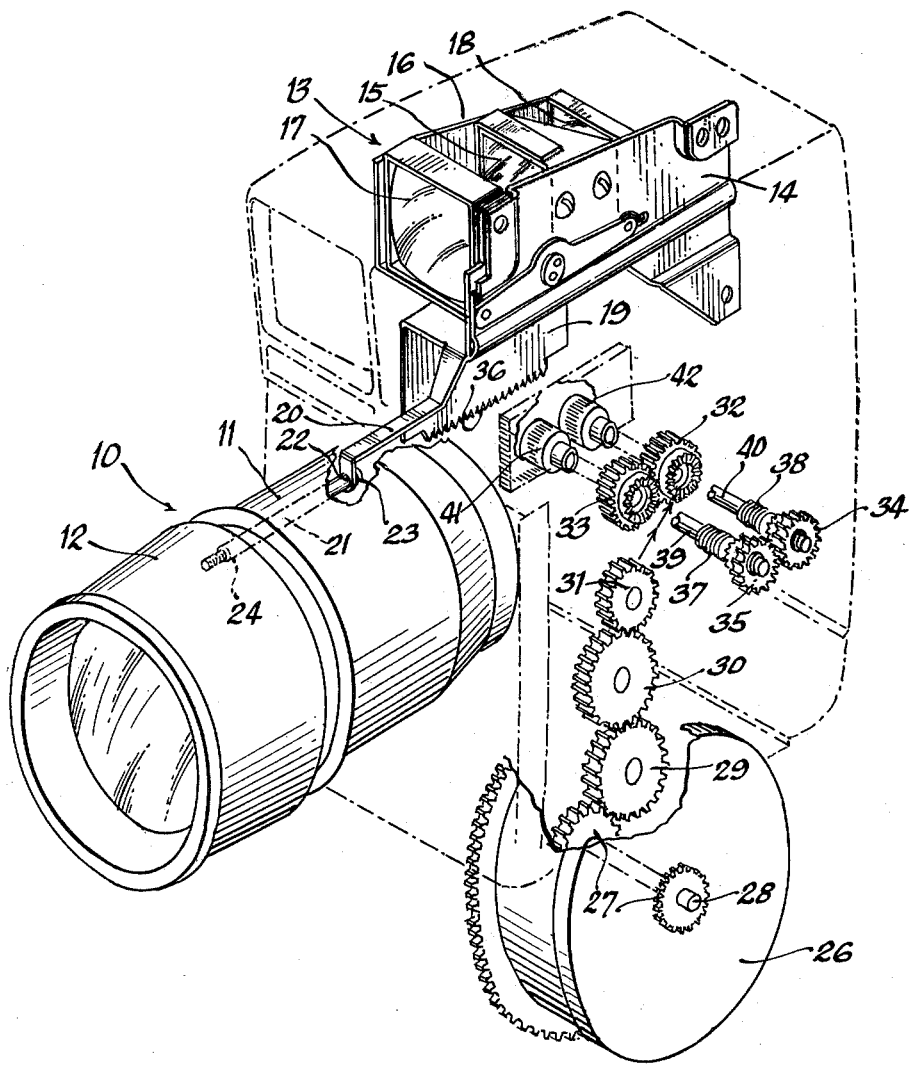
FIGURE 1 is an exploded diagrammatic view of a preferred embodiment of a mechanism for automatically adjusting a zoom lens assembly, while maintaining such lens assembly in synchronized relationship with an adjustable view finder.

Referring to FIGURE 1 of the drawings, a conventional movie camera of the type having a pair of film spools for guiding a roll of film progressively past an exposure aperture, a spring motor connected to drive said film spools, and control means for starting and stopping said motor, is provided with a zoom lens assembly 10 having at least one fixed lens in its stationary rear section 11 and at least one movable lens in its telescoping forward section 12. A view finder assembly generally designated at 13, consisting of a mounting plate 14 carrying a fixed view finder lens 15 and a movable lens mount 16 carrying a pair of movable lenses 17 and 18, is coupled together and maintained in synchronized relationship with the zoom lens assembly 10 by means of a bracket 19 provided with an extending arm 20 to which an actuating rod 21 is attached at one end 22 by a retaining ring 23, the opposite end 24 of said actuating rod 21 being screw-threaded to the telescoping forward portion 12 of the zoom lens assembly 10.

The advantage of coupling zoom lens assembly 10 and view finder assembly 13 is, of course, that the camera operator is enabled to see at all times in the view finder 25 (FIG. 2) the precise field which is being photographed at any given point throughout the range of movement of the telescoping forward portion 12 of zoom lens assembly 10.

Figure 2:
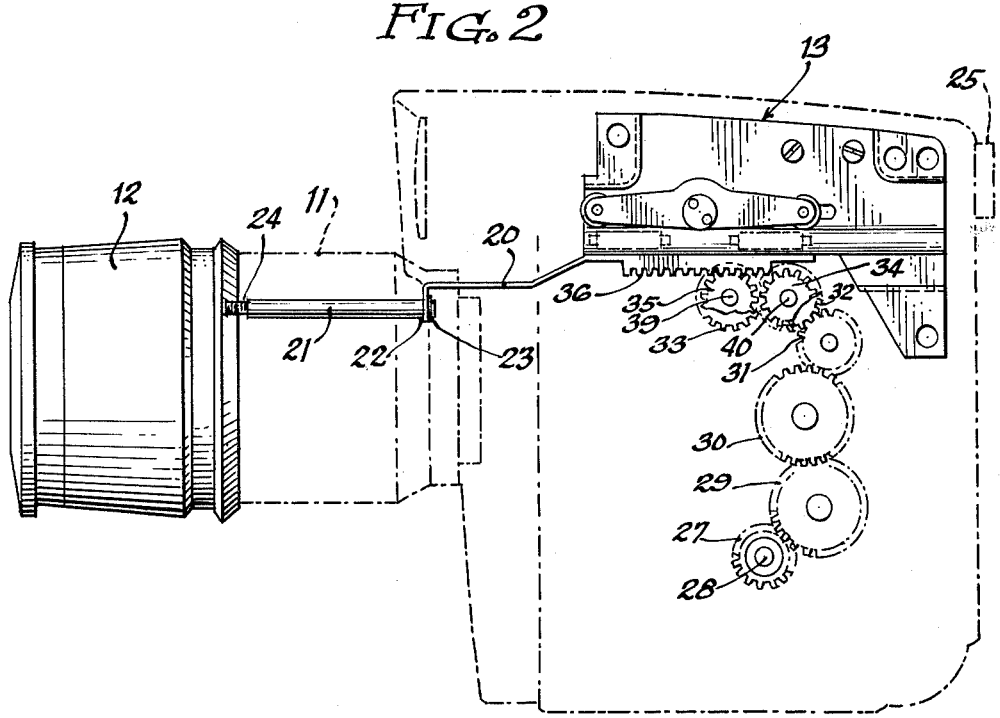
FIGURE 2 is a side elevation of the mechanism shown in FIGURE 1, in assembled relationship.
Figure 3:
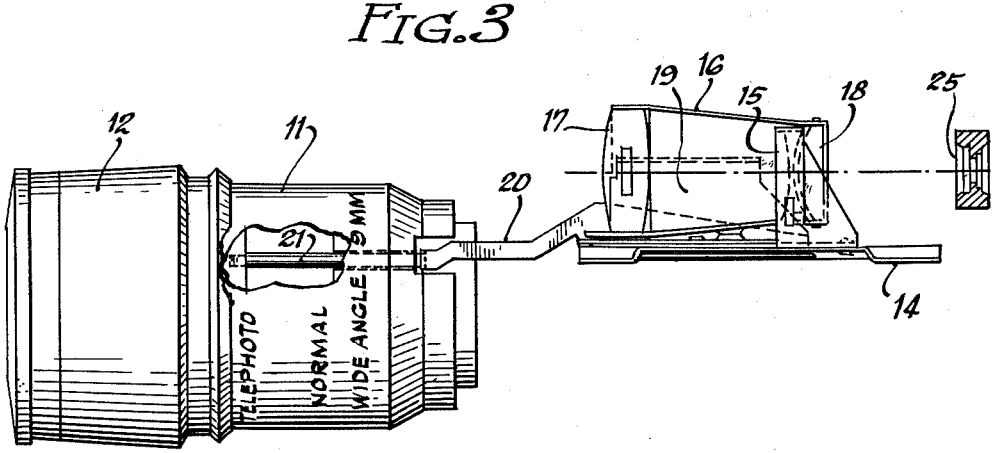
FIGURE 3 is a top view of a portion of the mechanism shown in FIGURE 2.

In the preferred embodiment of the invention shown in FIGURES 1, 2 and 3 of the drawings, the mechanism for adjusting zoom lens assembly 10 is driven by the camera's conventional spring motor (not shown) positioned within motor housing 26, and includes a pinion 27 mounted on rotating shaft 28 projecting outward from motor housing 26, which is mechanically connected through a train of idler gears 29, 30 and 31 with a clutch gear 32, meshing in turn with a second clutch gear 33.

It will be apparent that, at all times when the spring motor positioned within housing 26 is operating, clutch gears 32 and 33 will be continuously driven, through gear trains 29, 30 and 31, by the spring pinion 27 mounted on rotating motor shaft 28.

A pair of pinions 34 and 35, adapted to engage the rack 36 formed in the lower edge of bracket 19 but not to engage each other, are normally spaced apart from the continually rotating clutch gears 32 and 33 by springs 37 and 38 on shafts 39 and 40. To enable the camera operator to selectively engage either pinion 34 or pinion 35 with rack 36, a pair of clutch buttons 41 and 42 are also mounted on shafts 39 and 40, projecting outside the camera frame at a point in close proximity to the camera operating button, thus making it unnecessary for the camera operator to shift the position of either hand when he wishes to depress either clutch button 41 or clutch button 42.

To adjust the telescoping portion 12 of lens assembly 10 forwardly, the camera operator depresses clutch button 42, thereby overcoming the resistance of spring 38 and causing clutch gear 32, which is continually rotating in a counter-clockwise direction, to engage pinion 34, which drives rack 36, actuating rod 21 and the telescoping portion 12 of lens assembly 10 in a forward direction. This forward movement will continue until such time as the camera operator releases clutch button 42, thereby disengaging pinion 34 and clutch gear 32, or until rack 36 runs off pinion 34, to the position shown in FIGURE 2 of the drawings, at which point the telescoping portion 12 of lens assembly 10 has reached its extreme forward (or telephoto) position.

To reverse the movement of the zoom lens assembly 10, the camera operator depresses clutch button 41, thereby overcoming the resistance of spring 37 and causing clutch gear 33, which rotates in a clockwise direction, to engage pinion 35 and drive rack 36, actuating rod 21 and the telescoping portion 12 of lens assembly 10 in a backward direction, until the operator releases clutch button 41, thereby disengaging clutch gear 33 and pinion 35, or until rack 36 reaches the limit of its backward movement by running out of engagement with pinion 35.

It will be evident that, once the rack 36 has run out of engagement with the pinion driving it, the operator's failure to release the clutch button which controls the engagement of the driving pinion and its mating clutch gear will not result in any damage to the driving mechanism, since the driving pinion will simply turn idly until such time as the clutch button is released.

It will also be apparent that the gear train arrangement described and shown in FIGURES 1 and 2 could be utilized with a battery operated electric camera motor or any other conventional power source, as well as by a spring motor of the type contemplated in the preferred embodiment shown in the drawings.

There is thus provided a mechanism by which the camera operator is enable to automatically adjust the telescoping portion 12 of zoom lens assembly 10 forward or backward by a relatively slight movement of one finger, thereby eliminating one of the principle causes of the blurred or fuzzy pictures frequently obtained with the manually operated zoom lens assemblies heretofore employed on the 8 mm. cameras customarily used by amateur photographers.

Figure 4:
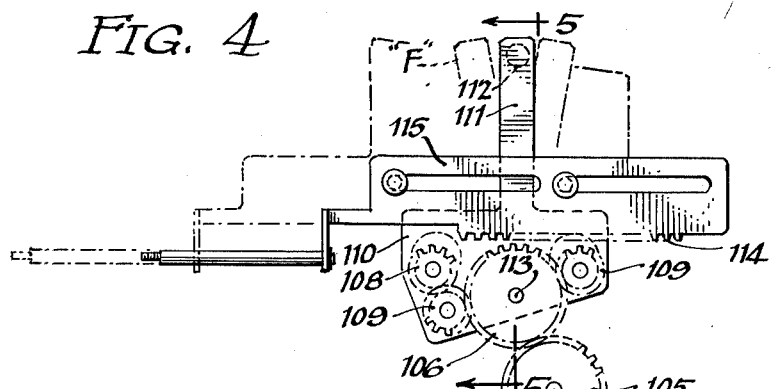
FIGURE 4 is a side elevation of an alternative mechanism for automatically adjusting a zoom lens assembly maintained in synchronized relationship with an adjustable view finder.

An alternative driving mechanism is shown in FIGURE 4. In this arrangement, spring pinion 101, mounted on the rotating shaft 102 of a spring motor positioned within housing 103, is connected through a gear train consisting of idler gears 104, 105, 106 and 107 to a pair of pinions 108 and 109. Pinions 108 and 109, together with idle gear 107, are rotatively mounted on a plate 110 provided with an upwardly extending member 111, from which a control lever 112, mounted in a perpendicular plane with respect to the extending member 111 and plate 110 (as best shown in FIGURE 5), projects beyond the camera frame in such a manner as to be subject to manipulation by the camera operator.

Plate 110 is pivotally mounted upon the same shaft 113 as idler gear 106. As shown by the dotted lines in FIGURE 4, the extending arm 111 carried by plate 110 may be moved either forward or backward, thereby enabling the camera operator to selectively engage pinion 108 or pinion 109 with the rack 114, formed in the lower edge of bracket 115, and drive it in the desired direction. It will, of course, be understood that any movement of bracket 115 effects a simultaneous synchronized adjustment of the zoom lens assembly and coupled view finder, by means which are not shown in detail in FIGURE 4 but clearly appear in FIGURES 1, 2 and 3.

Figure 5:
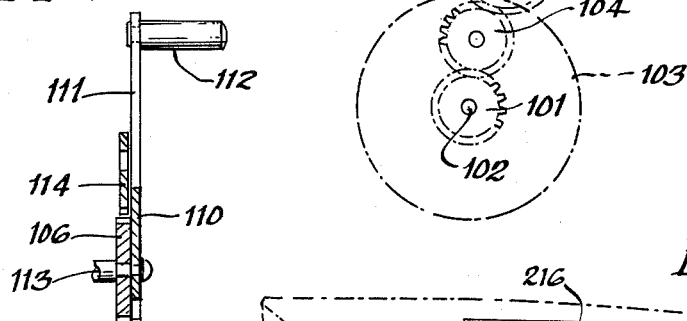
FIGURE 5 is a view along the line 5—5 in FIGURE 4.

It will thus be evident that, to adjust the zoom lens forwardly with the mechanism shown in FIGURES 4 and 5, the camera operator simply moves the control lever 112 to the forward position (as shown by the dotted lines designated "F" in FIGURE 4), thereby causing the plate 110 to pivot about shaft 113 until pinion 109, which is continually driven in a counter-clockwise direction by spring pinion 101 through idler gears 104, 105 and 106, engages rack 114 and drives it forward until control lever 112 is returned to the neutral position (the position shown in full lines in FIGURE 4) or rack 114 runs out of engagement with pinion 109.

Conversely, to drive the zoom lens in the opposite direction, the camera operator moves control lever 112 toward the rear of the camera, thereby pivoting rocker plate 110 about shaft 113 until pinion 108, which is continually driven in a clockwise direction by spring pinion 101 through idler gears 104, 105, 106 and 107, engages rack 114 and drives it backward until the control lever 112 is returned to the neutral position or rack 114 runs out of engagement with pinion 110, i.e., to the position shown in full lines in FIGURE 4.

Figure 6:
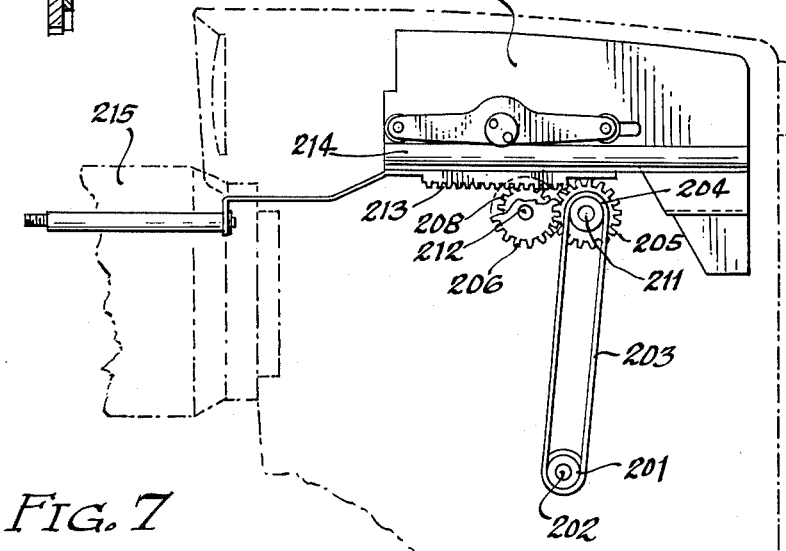
FIGURE 6 is a side elevation of a third alternative mechanism for accomplishing the automatic adjustment of a zoom lens assembly, while maintaining it in synchronized relation with an adjustable view finder.
Figure 7:
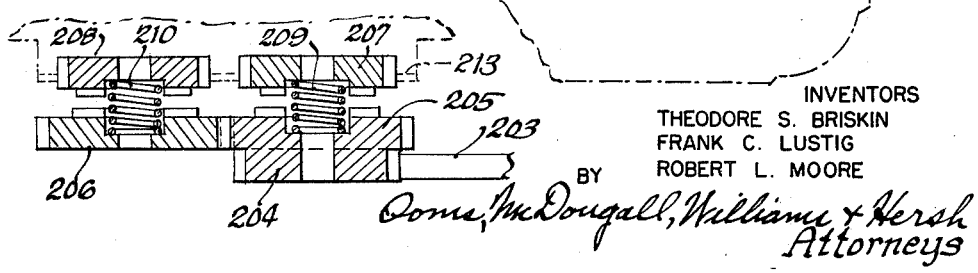
FIGURE 7 is a top view of a portion of the mechanism shown in FIGURE 6.

A third mechanism for automatically adjusting a zoom lens assembly maintained in synchronized relationship with an adjustable view finder is shown in FIGURES 6 and 7 of the drawings. In this embodiment, a pulley 201 mounted on the rotating shaft 202 of a spring motor (not shown), is connected by a belt drive 203 with the flanged portion 204 of a clutch gear 205, which meshes with a second clutch gear 206. It will thus be apparent that, at all times when the spring motor of the camera is operating, clutch gears 205 and 206 will be continuously driven in opposite directions by belt drive 203.

As best shown in FIGURE 7, a pair of pinions 207 and 208 having a diameter somewhat smaller than that of their respective mating clutch gears 205 and 206, are normally prevented from engaging said clutch gears by the springs 209 and 210 on shafts 211 and 212. Both pinions 207 and 208, however, are in mesh with the rack 213 formed in the lower part of the bracket 214, by which zoom lens assembly 215 and view finder assembly 216 are maintained in synchronized relationship. With this arrangement, the camera operator is enabled to drive the rack 213 forward or backward by selectively engaging pinion 207 or pinion 208 with its mating clutch gear. This can be accomplished by utilizing a pair of clutch buttons of the type shown in FIGURE 1, or any other suitable means for overcoming the resistance of springs 209 and 210.

As will be readily apparent, the engagement of pinion 207 with clutch gear 205 will drive the rack 213 and zoom lens 215 in a forward direction, while engagement of pinion 208 with clutch gear 206 will cause the rack and lens to move backward. Once the operator has effected the engagement which will cause rack 207 to be driven in the desired direction, the rack will continue to move in that direction until such time as the driving pinion and its mating clutch gear are disengaged or the rack runs out of engagement with the driving pinion.

Figure 8:
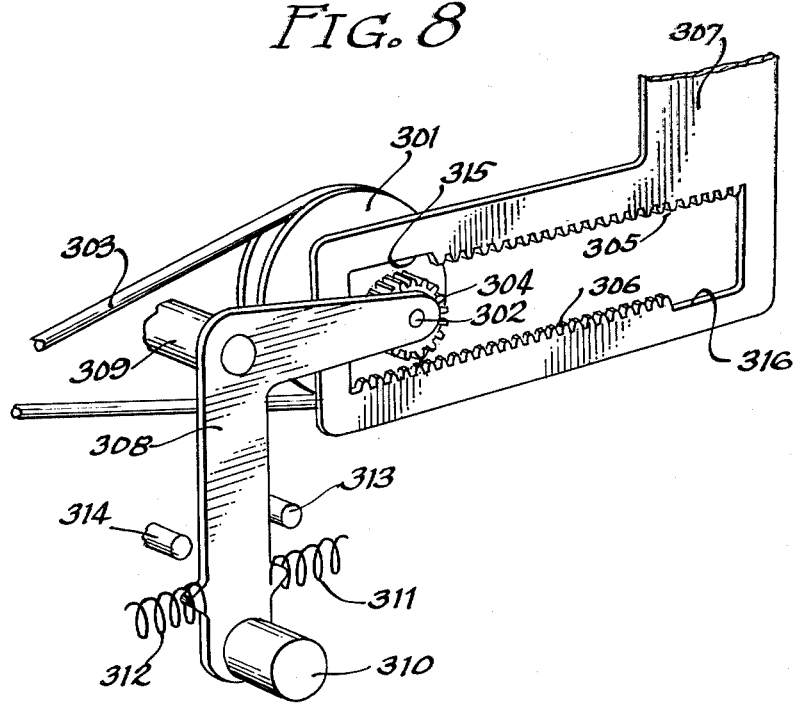
FIGURE 8 is a diagrammatic representation of a fourth alternative mechanism for automatically adjusting a zoom lens assembly and coupled view finder.

A fourth alternative mechanism embodying the invention is shown in FIGURE 8. In this construction a pulley 301 mounted on shaft 302 is driven in a clockwise direction by a belt drive 303 from the camera motor (not shown). A gear drive 304, also mounted on shaft 302 and driven in a clockwise direction by belt drive 303, is adapted for selective engagement with upper rack 305 or lower rack 306 on bracket 307, to which both a zoom lens assembly and coupled view finder (not shown) are rigidly attached.

The means for selectively engaging drive gear 304 with rack 305 or rack 306 consists of a control arm 308 pivotally mounted on shaft 309 and provided with a control button 310, which projects beyond the camera frame at a point suitable for manipulation by the camera operator. The control arm 308 is normally held in the neutral position, in which it is shown in FIGURE 8, by a pair of springs 311 and 312, but can be moved in either direction until it contacts one of two stop pins 313 and 314, provided to insure that drive gear 304 will properly engage the teeth of racks 305 and 306 but will not bottom in the clearance slots 315 and 316 located at the opposite ends of upper rack 305 and lower rack 306, respectively.

To effect a forward adjustment of the zoom lens assembly and coupled view finder with the control mechanism shown in FIGURE 8, the camera operator moves control button 310 forward from its neutral position until it engages stop pin 313, thereby causing drive gear 304 to be pivoted into engagement with the upper rack 305 on bracket 307. In this position, bracket 307, together with the zoom lens assembly and coupled view finder (not shown), will be driven forward until the operator releases control button 310, permitting spring 311 to return control arm 308 to the neutral position, or until drive gear 304 runs out of engagement with rack 305 into clearance slot 315, i.e., to the position shown in FIGURE 8. To reverse the movement of the lens assembly and adjustable view finder, the control button 310 is moved to the rear until control arm 308 contacts stop pin 314, at which point drive gear 304 will have been pivoted downward into engagement with the lower rack 306 in bracket 307. While drive gear 304 and rack 306 are thus engaged, bracket 307 will be driven backward until the camera operator releases control button 310, thereby permitting spring 312 to return control arm 308 and drive gear 304 to the neutral position, or until drive gear 304 runs out of engagement with rack 306 into clearance slot 316.

The mechanism shown in FIGURE 8 could be easily modified by the substitution of a friction roller for drive gear 304 and the utilization of a pair of friction surfaces in lieu of the racks 305 and 306.

It will be apparent that, with each of the foregoing embodiments of the invention, the camera operator may adjust the zoom lens assembly and coupled view finder manually rather than automatically, if he prefers, since the telescoping portion 12 of zoom lens assembly 10 is free to be moved forward or backward at any time when the automatic lens adjusting mechanism has not been engaged with the camera's spring motor.

Still another mechanism for accomplishing the automatic adjustment of a zoom lens assembly and coupled view finder is shown in FIGURE 9 of the drawings. In this arrangement a friction disk 401 having a centrally positioned recess 402 is mounted on the rotating shaft 403 of the camera motor (not shown). A friction roller 404 is slidably mounted on a second shaft 405, which also carried a screw 406 and half-nut 407, nut 407 being rigidly attached by any conventional means to a zoom lens assembly and coupled view finder, the details of which are not shown in this drawing but will be readily understood from the preceding description and drawings.

The position of friction roller 404 with respect to friction disk 401 may be shifted by movement of a control member 408 pivotally mounted on shaft 409, the member 408 being provided at its upper end with a control button 410, which projects beyond the camera frame at a position suitable for manipulation by the camera operator, and near its lower end with a bracket 411, by means of which friction roller 404 may be slidably moved along shaft 405. A spring 412 carried on the rotating camera motor shaft 403 urges disk 401 toward engagement with roller 404, which is normally seated in the central recess 402 in disk 401 by virtue of a pair of opposing spring-stops 413 and 414, which tend to hold control member 408, bracket 411 and roller 404 in a neutral position. A member 415 having a pair of stop elements 416 and 417, which project into the path of travel of nut 407, is also attached at one end to control member 408.

By moving control button 410 toward the front of the camera until the lower end of the control member 408 contacts the stop element of spring-stop 414, i.e., to the position shown in FIGURE 9, the camera operator causes friction roller 404 to be moved backward along shaft 405 into engagement with friction disk 401, which is rotating in a counter-clockwise direction but will drive the roller 404 in a clockwise direction. The clockwise rotation of roller 404 will, in turn, drive shaft 405 and screw 406 in the same direction, causing half-nut 407 to travel forward along screw 406 until it contacts stop element 416 and forces control member 408, bracket 411 and friction roller 404 to return to the neutral position, or until the operator of his own accord releases the pressure on control button 410, permitting control member 408 to be returned to the neutral position by spring-stop 414.

Since half-nut 407 is rigidly attached to the zoom lens assembly and coupled view finder, it will be apparent that the forward movement of nut 407 along screw 406 will effect a forward adjustment of both the zoom lens and view finder. It will also be obvious that, to effect a backward adjustment of the zoom lens and view finder, the operator simply moves the control button 410 toward the rear of the camera until the lower end of control member 408 contacts the stop elements of spring-stop 413, thereby causing bracket 411 to move friction roller 404 forward along shaft 405 to a point where it will be driven by friction disk 401 in a counter-clockwise direction. The counter-clockwise rotation of roller 404 drives shaft 405 and screw 406 in the same direction, causing half-nut 407 to travel backward along screw 406 until it contacts stop element 417 and forces control member 408, bracket 411 and roller 404 to return to the neutral position, or until the operator releases control button 410, permitting the return to the neutral position to be effected by spring-stop 413.

Although all of the foregoing embodiments of the invention contemplate the utilization of energy borrowed from the camera's main motor, it will be obvious that the various mechanisms shown and described could, if preferred, be powered by a separate motor.

It will also be understood that the detailed descriptions of the various embodiments of the invention shown in the accompanying drawings are illustrative only, and that numerous changes therein and modifications thereof might be made by persons skilled in the art without departing from the substance of the invention. It is accordingly intended that the scope of the invention shall not be limited by the description and drawings but shall be determined primarily by references to the appended claims.

We claim:

1. In a motion-picture camera of the type having a housing, means defining an exposure aperture, means comprising a film spool for passing photographic film progressively past said aperture, spring-powered motor means, means interconnecting said spring motor and said spool, and control means manually operable from the exterior of said housing for starting and stopping said spring motor and rotating said spool at an operator's will, the improvement which comprises, in combination, a photographic lens assembly disposed in light-transmitting relation to said aperture, said assembly having at least one fixed lens and one movable lens, said lenses being aligned to define an optical axis, said movable photographic lens being adapted to be adjusted in either direction along said axis relative to said fixed photographic lens, a view finder assembly having at least one fixed lens and one movable lens, said lenses being aligned to define an optical axis, said movable view finder lens adapted to be adjusted in either direction along said axis relative to said fixed view finder lens, said optical axes being parallel but displaced relative to one another, a rigid link interconnecting said movable lenses and modified along one edge to define a rack, said rigid link and said rack being rectilinearly movable throughout a predetermined path of movement within said housing, a gear train drivingly interconnected with said spring motor for rotation thereby, a pair of gears respectively mounted for rotation around axes respectively parallel to one another and mutually perpendicular to both of said optical axes, each of said last mentioned pair of gears being positioned for meshing relationship with said rack through at least a portion of the path of movement of said rack, spring means for maintaining each of said pair of gears in a normally disengaged relationship with respect to said gear train, said movable lenses being manually adjustable with respect to said fixed lenses when both of said pair of gears are so disengaged from said gear train, a first engageable and releasable clutch means operative when engaged to interconnect said gear train and one of said pair of gears for rotating said gear in one direction under the urging of said spring motor, a second engageable and releasable clutch means operative when engaged to interconnect said gear train and the other of said pair of gears for rotating said other gear in the opposite direction under the urging of said spring motor, and manually operable control means disposed partially within and partially external of said housing operable at an operator's will selectively to engage and release either of said clutch means.

2. In a motion-picture camera of the type having a housing, means defining an exposure aperture, means comprising a film spool for passing photographic film progressively past said aperture, spring-powered motor means, means interconnecting said spring motor and said spool, and control means manually operable from the exterior of said housing for starting and stopping said spring motor and rotating said spool at an operator's will, the improvement which comprises, in combination, a photographic lens assembly disposed in light-transmitting relation to said aperture, said assembly having at least one fixed lens and one movable lens, said lenses being aligned to define an optical axis, said movable photographic lens being adapted to be adjusted in either direction along said axis relative to said fixed photographic lens, a view finder assembly having at least one fixed lens and one movable lens, said lenses being aligned to define an optical axis, said movable view finder lens adapted to be adjusted in either direction along said axis relative to said fixed view finder lens, said optical axes being parallel but displaced relative to one another, a rigid link interconnecting said movable lenses and modified along one edge to define a rack, said rigid link and said rack being rectilinearly movable throughout a predetermined path of movement within said housing, a gear train drivingly interconnected with said spring motor for rotation thereby, a pair of gears respectively mounted for rotation around axes respectively parallel to one another and mutually perpendicular to both of said optical axes, each of said last mentioned pair of gears being positioned for meshing relationship with said rack through at least a portion of the path of movement of said rack, a first engageable and releasable clutch means operative when engaged to interconnect said gear train and one of said pair of gears for rotating said gear in one direction under the urging of said spring motor, a second engageable and releasable clutch means operative when engaged to interconnect said gear train and the other of said pair of gears for rotating said other gear in the opposite direction under the urging of said spring motor, resilient biasing means for each of said clutch means for normally holding said clutch means in released position, said movable lenses being manually adjustable with respect to said fixed lenses when both of said clutch means are in the released position, and manually operable control means disposed partially within and partially external of said housing operable at an operator's will selectively to engage and release either of said clutch means.

3. In a motion-picture camera of the type having a housing, means defining an exposure aperture, means comprising a film spool for passing photographic film progressively past said aperture, spring-powered motor means, means interconnecting said spring motor and said spool, and control means manually operable from the exterior of said housing for starting and stopping said spring motor and rotating said spool at an operator's will, the improvement which comprises, in combination, a photographic lens assembly disposed in light-transmitting relation to said aperture, said assembly having at least one fixed lens and one movable lens, said lenses being aligned to define an optical axis, said movable photographic lens being adapted to be adjusted in either direction along said axis relative to said fixed photographic lens, a view finder assembly having at least one fixed lens and one movable lens, said lenses being aligned to define an optical axis, said movable view finder lens adapted to be adjusted in either direction along said axis relative to said fixed view finder lens, said optical axes being parallel but displaced relative to one another, a rigid link interconnecting said movable lenses and modified along one edge to define a rack, said rigid link and said rack being rectilinearly movable throughout a predetermined path of movement within said housing, a gear train drivingly interconnected with said spring motor for rotation thereby, a pair of gears respectively mounted for rotation around axes respectively parallel to one another and mutually perpendicular to both of said optical axes, each of said last mentioned pair of gears being positioned for meshing relationship with said rack through at least a portion of the path of movement of said rack, a first engageable and releasable clutch means operative when engaged to interconnect said gear train and one of said pair of gears for rotating said gear in one direction under the urging of said spring motor, a second engageable and releasable clutch means operative when engaged to interconnect said gear train and the other of said pair of gears for rotating said other gear in the opposite direction under the urging of said spring motor, resilient biasing means for each of said clutch means for normally holding said clutch means in released position, said movable lenses being manually adjustable with respect to said fixed lenses when both of said clutch means are in the released position, a first manually operable control means disposed partially within and partially external of said housing operable at an operator's will to engage and release said first clutch means, and a second manually operable control means disposed partially within and partially external of said housing operable at an operator's will to engage and release said second clutch means.

4. In a motion-picture camera of the type having a housing, means defining an exposure-aperture, means comprising a film spool for passing photographic film progressively past said aperture, spring-powered motor means, means interconnecting said spring motor and said spool, visual view finder means situated in said housing in a position accessible to an operator's eye when said camera is being held for picture-taking, and control means manually operable from the exterior of said housing for starting and stopping said spring motor and rotating said spool at an operator's will, the improvement which comprises, in combination, an optical system having a photographic light-transmitting portion and a view-finding light-transmitting portion, said system including movable lens means for receiving and focusing photographic light and view-finding light, said system also including fixed photographic lens means for focusing said photographic light through said aperture onto said film, and fixed light-directing means for guiding said view-finding light into said visual view finder, a rigid link connected to said movable lens means and modified along one edge to define a rack, said rigid link and said rack being rectilinearly movable throughout a predetermined path of movement within said housing, a gear train drivingly interconnected with said spring motor for rotation thereby, a pair of gears respectively mounted for rotation around axes respectively parallel to one another and mutually perpendicular to the path of movement of said rack, each of said last mentioned pair of gears being positioned for meshing relationship with said rack through at least a portion of the path of movement of said rack, a first engageable and releasable clutch means operative when engaged to interconnect said gear train and one of said pair of gears for rotating said gear in one direction under the urging of said spring motor, a second engageable and releasable clutch means operative when engaged to interconnect said gear train and the other of said pair of gears for rotating said other gear in the opposite direction under the urging of said spring motor, resilient biasing means for each of said clutch means for normally holding said clutch means in released position, said movable lens means being manually adjustable when both of said clutch means are in the released position and manually operable control means disposed partially within and partially external of said housing operable at an operator's will selectively to engage and release either of said clutch means.

5. In a motion-picture camera of the type having a housing, means defining an exposure aperture, means comprising a film spool for passing photographic film progressively past said aperture, motor means interconnected with said film spool, and control means manually operable from the exterior of said housing for starting and stopping said motor and rotating said film spool at an operator's will, the improvement which comprises, in combination, a photographic lens assembly disposed in light-transmitting relation to said aperture, said assembly having at least one fixed lens and one movable lens, said lenses being aligned to define an optical axis, said movable photographic lens being adapted to be adjusted in either direction along said axis relative to said fixed photographic lens, a view finder assembly having at least one fixed lens and one movable lens, said lenses being aligned to define an optical axis, said movable view finder lens adapted to be adjusted in either direction along said axis relative to said fixed view finder lens, said optical axes being parallel but displaced relative to one another, linking means interconnecting said movable lenses, a gear train interposed between said motor and said movable lenses and adapted to be rotated by said motor to adjust said movable lenses, a rocker plate carrying a pair of gears adapted to be selectively interposed in said gear train to adjust said movable lenses at the will of a camera operator, said rocker plate having a first position in which one of said pair of gears is interposed in said gear train to adjust said movable lenses away from said fixed lenses, a second position in which the other of said pair of gears is interposed in said gear train to adjust said movable lenses toward said fixed lenses, and a neutral position in which neither of said pair of gears is interposed in said gear train, control means disposed partially within and partially external of said housing operable at an operator's will selectively to move said rocker plate into any of said first, second and neutral positions, and alternative lens positioning means associated with said movable lenses whereby the position of said movable lenses may be manually adjusted independently of said motor in response to force applied directly to said alternative lens positioning means when said control means is in the neutral position.

6. In a motion-picture camera of the type having a housing, means defining an exposure aperture, means comprising a film spool for passing photographic film progressively past said aperture, motor means interconnected with said film spool, visual view finder means situated in said housing in a position accessible to an operator's eye when said camera is being held for picture-taking, and control means manually operable from the exterior of said housing for starting and stopping said motor and rotating said spool at an operator's will, the improvement which comprises, in combination, an optical system having a photographic light-transmitting portion and a view-finding light-transmitting portion, said system including movable lens means for receiving and focusing photographic light and view-finding light, said system also including fixed photographic lens means for focusing said photographic light through said aperture and fixed-light-directing means for guiding said view-finding light into said visual view finder, a linking member connected to said movable lens means, said linking member having an upper bearing surface and a lower bearing surface formed therein, said linking member and said upper and lower bearing surfaces being adapted to be moved rectilinearly through a predetermined path of movement within said housing, a driving wheel interconnected with said spring motor for rotation thereby, said driving wheel being mounted for rotation around an axis perpendicular to the path of movement of said linking member and adapted to be selectively engaged with said upper and lower bearing surfaces to drive said linking member and thereby adjust said movable lens means, control means disposed partially within and partially external of said housing operable at an operator's will selectively to engage said driving wheel with either said upper bearing surface or said lower bearing surface, said control means having a first position in which said driving wheel is engaged with the upper bearing surface to drive said linking member and adjust said movable lens means in one direction under the urging of said spring motor, a second position in which said driving wheel is engaged with the lower bearing surface to drive said linking member and adjust said movable lens means in the opposite direction under the urging of said spring motor, and a neutral position in which said driving wheel is disengaged from said upper and lower bearing surfaces, and alternative lens positioning means associated with said movable lens means whereby the position of said movable lens means may be manually adjusted independently of said motor in response to force applied directly to said alternative lens positioning means when said control means is in the neutral position.

7. In a camera of the type having a housing, means defining an exposure aperture, means for guiding photographic film progressively past said aperture, spring-powered motor means, means inter-connecting said spring motor with said film-guiding means, visual view finder means situated in said housing in a position accessible to an operator's eye when said camera is being held for picture-taking, and control means manually operable from the exterior of said housing for starting and stopping said spring motor at an operator's will, the improvement which comprises, in combination, an optical system having a photographic light-transmitting portion and a view-finding light-transmitting portion, said system including movable lens means for receiving and focusing photographic light and view-finding light, said system also including fixed photographic lens means for focusing said photographic light through said aperture onto said film and fixed light-directing means for guiding said view-finding light into said visual view finder, a power-transmitting train interconnecting said spring motor with said movable lens means and having a first part movable with said lens means and a second part movable with said spring motor, control means adapted to adjust the relative positions of said first and second parts of said train, said control means being manually operable from the exterior of said housing at an operator's will during operation of said spring motor to place said first and second parts in any selected one of three relative positions, said parts being drivingly engaged in the first of said positions to adjust said movable lens means away from said fixed components of said optical system and being drivingly engaged in the second of said positions to adjust said movable lens means toward said fixed components, said first and second parts being disengaged in the third of said positions, said first part of said train, when disengaged from said second part, being characterized by sufficiently low internal friction to permit easy movement in either direction in response to manual force, and alternative lens-positioning means manually operable to adjust said movable lens means in either direction at an operator's will when said first and second parts of said train are disengaged.

8. In a motion-picture camera of the type having a housing, means defining an exposure aperture, means comprising a film spool for passing photographic film progressively past said aperture, motor means interconnected with said film spool, visual view finder means situated in said housing in a position accessible to an operator's eye when said camera is being held for picture-taking, and control means manually operable from the exterior of said housing for starting and stopping said motor and rotating said spool at an operator's will, the improvement which comprises, in combination, an optical system having a photographic light-transmitting portion and a view-finding light-transmitting portion, said system including movable lens means for receiving and focusing photographic light and view-finding light, said system also including fixed photographic lens means for focusing said photographic light through said aperture and fixed light-directing means for guiding said view-finding light into said visual view finder, a gear train interposed between said motor and said movable lens means and adapted to be rotated by said motor to adjust said movable lens means, a rocker plate carrying a pair of gears adapted to be selectively interposed in said gear train to adjust said movable lens means at the will of a camera operator, said rocker plate having a first position in which one of said pair of gears is interposed in said gear train to adjust said movable lens means in one direction under the urging of said spring motor, a second position in which the other of said pair of gears is interposed in said gear train to adjust said movable lens means in the opposite direction under the urging of said spring motor, and a neutral position in which neither of said pair of gears is interposed in said gear train, control means disposed partially within and partially external of said housing operable at an operator's will selectively to move said rocker plate into any of said first, second and neutral positions, and alternative lens positioning means associated with said movable lens means whereby the position of said movable lens means may be manually adjusted independently of said motor in response to force applied directly to said alternative lens positioning means when said control means and said rocker plate are in the neutral position.

References Cited in the file of this patent

UNITED STATES PATENTS

| | | |
|---|---|---|
| 1,275,863 | Davis | Aug. 13, 1918 |
| 1,870,464 | Ramsey | Aug. 9, 1932 |
| 1,920,072 | Ginsberg | July 25, 1933 |
| 1,950,166 | Durholz | Mar. 6, 1934 |
| 2,043,900 | Mihalyi | June 9, 1936 |
| 2,183,523 | Wood | Dec. 19, 1939 |
| 2,451,017 | Aldreany | Oct. 12, 1948 |
| 2,532,685 | Walker | Dec. 5, 1950 |
| 2,640,777 | Fachman | June 2, 1953 |
| 2,782,683 | Walker | Feb. 26, 1957 |
| 2,860,560 | Traino et al. | Nov. 18, 1958 |
| 2,924,146 | Back | Feb. 9, 1960 |

FOREIGN PATENTS

| | | |
|---|---|---|
| 808,395 | Great Britain | Feb. 4, 1959 |
| 1,173,921 | France | Nov. 3, 1958 |